June 11, 1957 R. C. RUSSELL 2,795,154
POWER TRANSMITTING APPARATUS
Original Filed June 5, 1953 2 Sheets-Sheet 1

INVENTOR.
ROBERT C. RUSSELL
BY Hudson, Boughton,
Williams, David & Hoffmann
ATTORNEYS

INVENTOR.
ROBERT C. RUSSELL
BY
ATTORNEYS

United States Patent Office 2,795,154
Patented June 11, 1957

2,795,154

POWER TRANSMITTING APPARATUS

Robert C. Russell, Cleveland, Ohio, assignor to Eaton Manufacturing Company, Cleveland, Ohio, a corporation of Ohio Continuation of application Serial No. 359,839, June 5, 1953. This application December 12, 1956, Serial No. 627,800

25 Claims. (Cl. 74—677)

This invention relates to power transmission apparatus of the rotary fluid torque converter type, and as one of its objects, aims to provide a multiple-turbine form of such a torque converter in which a substantially higher torque amplification is obtained for the stall condition of operation, such that this transmission is well suited for use in automobiles and for heavy duty service, as in delivery trucks, tractors and other vehicles carrying heavy loads.

This application is a continuation of application Serial No. 359,839, filed June 5, 1953 and now abandoned.

Another object of the invention is to provide an improved transmission of the rotary fluid torque converter type having multiple turbine members, and in which mechanical gear means associated with the turbine members operatively connects the same with the output shaft means.

A further object is to provide an improved transmission of this character in which the turbine members comprise high-speed and intermediate-speed turbines connected with the output shaft means through mechanical gear means, and a low-speed turbine direct-connected with the output shaft means.

It is, likewise, an object of this invention to provide an improved transmission of the character just mentioned in which the multiple turbines include a low-speed turbine direct-connected with the output shaft means and a plurality of turbines of relatively higher speed, and in which mechanical gear means common to all of the relatively higher speed turbines operatively connects the same with the output shaft means.

Still another object is to provide an improved transmission of this character in which the mechanical gear means comprises interconnected planetary gear trains having driving or input members individual to the respective higher speed turbines and which gear means is, at times, referred to herein as a compound planetary gear system.

Yet another object is to provide an improved transmission of the character above referred to in which the means forming the direct-drive connections between the low-speed turbine and the output shaft means comprises planet pinion carrier means of the planetary gearing.

Additionally, this invention provides an improved transmission of the above-mentioned torque converter type having high-speed, intermediate-speed and low-speed turbine members and in which the low-speed turbine member constitutes a greater angular portion of the transverse annular fluid path of the toroidal circuit than the aggregate angular portion defined by the high-speed and intermediate-speed turbines.

The invention can be further briefly summarized as consisting in certain novel combinations and arrangements of parts hereinafter described and particularly set out in the claims hereof.

In the accompanying sheets of drawings, forming a part of this specification:

Figure 1:
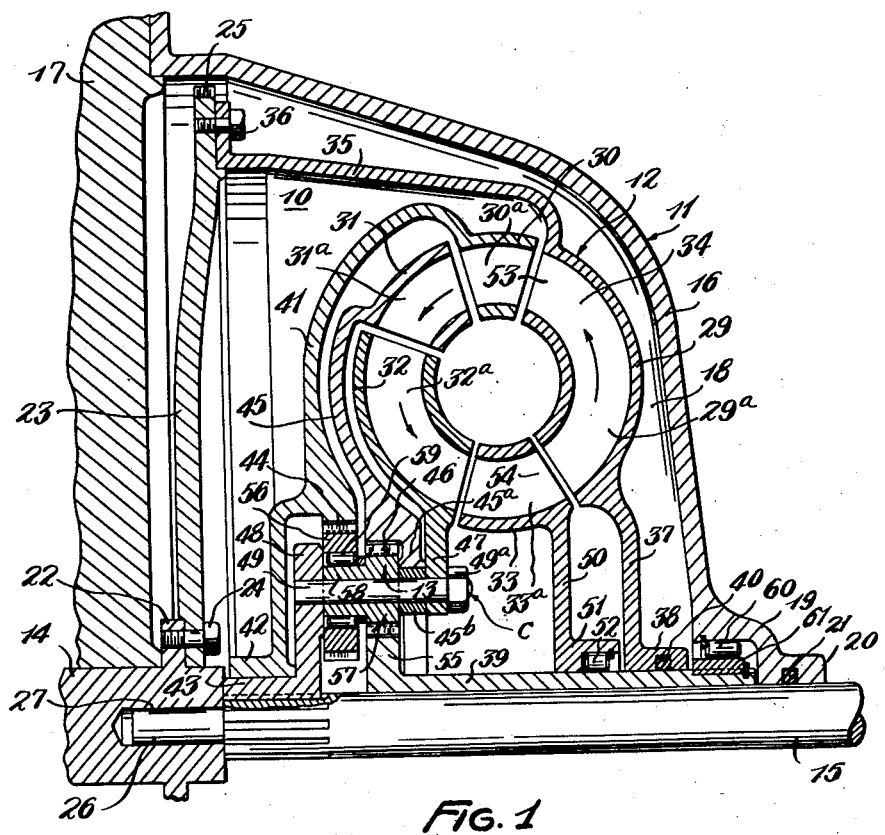
Fig. 1 is mainly a vertical axial section showing a transmission of the torque converter type embodying this invention.

As representing one practical embodiment of the present invention, Fig. 1 shows the improved transmission 10 as comprising in general a stationary outer housing 11, a torque amplification device or converter 12 of the toroidal fluid circuit type and mechanical gearing 13 associated with such torque converter. The transmission 10 also comprises a rotatable input member or shaft 14, such as a crankshaft, and a rotatable output member or shaft 15.

The stationary outer housing 11 comprises a housing member 16 which is secured to an adjacent structure 17, as for example a portion of a vehicle engine, and cooperates with the latter in defining the chamber 18. The stationary housing member 16 carries an axially projecting hub 19 supporting a hollow bearing 20 in which the output shaft 15 is rotatably journalled. A suitable packing ring 21 located in the bearing 20 extends around and sealingly engages the output shaft 15.

The input shaft 14 is provided with a radial flange 22 with which a disk member or flywheel 23 is connected by means of the screws 24. The flywheel 23 is provided peripherally thereof with gear teeth 25 adapted to be engaged by the driving pinion of a conventional starting motor (not shown). The output shaft 15 is axially aligned with the input shaft 14 and is provided with a reduced end portion 26 which is journalled in a pilot bearing socket 27 of the input shaft.

The torque converter 12 comprises a group of relatively rotatable bladed annular members 29, 30, 31, 32 and 33 in cooperating relation and defining a toroidal fluid path or circuit passage 34 interiorly of this device. The member 29 of this group is an annular pump member having an annular group of spaced blades or vanes 29ª therein and is adapted to be driven by the input shaft 14, through the flywheel 23 and the generally axially extending annular wall 35 which is connected with the flywheel by the screws 36. The pump member 29 is here shown as including a substantially radially disposed annular wall or web 37 having a central axial hub 38 which is journalled on an inner axial sleeve 39 surrounding the output shaft 15. The hub 38 is provided with a suitable packing ring 40 which extends around and sealingly engages the inner sleeve 39.

The annular member 30 constitutes a first or primary turbine member having an annular group of spaced vanes 30ª therein. This first or high-speed turbine is located in immediately adjacent relation to the pump member 29 and includes a generally radially disposed annular wall or web 41 having a central axial hub 42 journalled on an inner axial hub 43 which is splined to the output shaft 15. The wall 41 of this first turbine 30 carries a ring gear 44 which is disposed in surrounding coaxial relation to the output shaft 15 and to which further reference will presently be made.

The annular member 31 is secondary or intermediate-speed turbine member having an annular group of spaced vanes 31ᵃ therein. This second turbine includes a generally radially disposed annular wall or web 45 which carries a ring gear 46. The gear 46 is located adjacent the gear 44 and is also in surrounding coaxial relation to the output shaft 15, but is of a smaller diameter than the gear 44. The turbine member 31 also includes an axially offset annular bearing portion 45ᵃ which extends around and is slidable on the outer peripheral surface of a bearing ring 45ᵇ for mounting this turbine member for rotation in coaxial surrounding relation to the output shaft 15.

The annual member 32 is a third or low-speed turbine member having an annular group of spaced vanes 32ᵃ therein. This low-speed turbine member 32 includes a generally radially disposed annular wall or web 47 which is connected with a radial annular flange 48 of the inner sleeve 43 by means of an annular group of circumferentially spaced pivot shafts 49 located in surrounding coaxial relation to the output shaft 15. This low-speed turbine 32 is direct-connected with the output shaft 15 by a planet pinion carrier means C which is here shown as comprising the radial annular wall 47, the pivot shafts 49, the radial flange 48 and the inner axial hub 43 splined to the output shaft.

The pivot shafts 49 are provided at one end thereof with a shouldered portion which is drawn against the wall 47 by a nut 49ᵃ. At the opposite end thereof, the pivot shafts 49 which extend through circumferentially spaced openings of this ring.

The rotatable annular member 33 is a reaction member having an annular group of spaced vanes 33ᵃ therein. This reaction member includes a generally radially disposed annular wall or web 50 having a central axial hub 51 disposed around and journalled on the inner sleeve 39. The reaction member 33 is inhibited against reverse rotation by conventional one-way clutch means which is here represented by the annular group of clutch rollers 52 surrounding the inner sleeve 39 and housed in the hub 51.

From the above-described construction of the torque converter 12, it will be seen that the first, second and third turbines 30, 31 and 32, and the reaction member 33, are disposed in a series fluid circuit relation with the pump member 29 such that a velocity stream of hydraulic fluid delivered from the discharge end 53 of the pump member 29 in response to rotation thereof, will be supplied first to and transverse the first or high-speed turbine 30, after which it will traverse in succession the second or intermediate-speed turbine 31, the third or low-speed turbine 32, and the reaction member 33. From the reaction member 33, the fluid is returned to the inlet end 54 of the pump member 29.

The mechanical gear means 13 operably connects the turbine members 30, 31 and 32 with the output shaft 15, such that the low-speed turbine 32 has a direct-drive connection with the output shaft through the carrier means C as explained above. The gear means 13 also constitutes reduction gearing for all of the realtively higher speed turbines, that is, reduction gearing for the high-speed and intermediate-speed turbines 30 and 31.

The gear means 13 is here shown as comprising a compound planetary gear system, that is, a dual or double planetary gear means comprising interconnected planetary gear trains and which includes two driving or input members in the form of the large and small ring gears 44 and 46 of the high and intermediate speed turbines 30 and 31. This planetary gear system also comprises a planetary train reaction means in the form of a sun gear 55 carried by the inner end of the inner axial sleeve 39, and two sets of planet pinions 56 and 57. The set of planet pinions 56 comprising a group of annularly spaced hollow pinion gears meshing with the ring gear 44 and disposed in surrounding relation to the pivot shafts 49. The set of planet pinions 57 comprises a group of annularly spaced pinion gears meshing with the ring gear 46 and rotatably supported by the pivot shafts 49.

The two planetary gear trains are interconnected by the carrier means C which has the two sets of planet pinion gears 56 and 57 thereon. Suitable one-way clutch means is provided between the two sets of pinion gears 56 and 57 such that torque can be transmitted in one direction from the pinions of one set to the pinions of the other set. In this instance, the planet pinions 57 are provided with cylindrical axial projections 58 which extend into the openings of the hollow planet pinions 56. The one-way clutch means, here represented by an annular group of clutch rollers 59, is disposed between the planet pinions 56 and the axial projections 58 of the adjacent planet pinions 57. The one-way clutch means 59 thus provides a drive connection for transmitting torque from the planet pinions 56 to the planet pinions 57, but will permit the planet pinions 57 to overrun or lead the planet pinions 56 during certain conditions of operation of the transmission 10.

The planet pinions 57 also have meshed engagement with the sun gear 55, such that when the sun gear 55 is held against reverse rotation and the planet pinion gears 57 roll on the sun gear, these planet pinions gears will impart a forward rotary movement to the output shaft 15 through the pivot shafts 49 and the radial flange 48. The sun gear 55 is inhibited against reverse rotation by suitable one-way brake means which is here represented by an annular group of brake rollers 60. These rollers are disposed around a ring 61 which is splined to the inner sleeve 39 and are housed in the hub 19 of the housing member 16. In the gear system 13, it will be observed that the two interconnected planetary gear trains represented, respectively, by the planet pinion sets 56 and 57 are individual to the two higher speed turbines 30 and 31, and that only the one sun gear 55 is needed since this gear is common to both trains and serves both sets of planet pinions 56 and 57.

The torque amplification ratio between the first or high-speed turbine 30 and the output shaft 15 are provided by the gear system 13 can be, for example, a ratio of approximately 2.2 to 1. The torque amplification ratio between the second or intermediate-speed turbine 31 and the output shaft 15 as provided by the gearing 13 can be, for example, a ratio of approximately 1.5 to 1. Since the third or low-speed turbine 32 is direct-connected to the output shaft 15, the ratio between this turbine and the output shaft is a 1 to 1 ratio.

With a suitable blade shape and inclination for the blades 33ᵃ of the reaction member 33, this member will produce a further amplification in the torque developed by the turbine members 30, 31 and 32 as a reaction effect resulting from the fluid stream impinging against the reaction member after passing through these turbine members. For all practical purposes, this torque amplification produced by the reaction member 33 can be taken as being a 2 to 1 amplification ratio. The over-all torque output values for the turbine members 30 and 31 at the stall or starting condition of operation will therefore be 2×2.2=4.4 to 1 ratio for the turbine member 30 and 2×1.5=3.0 to 1 ratio for the turbine member 31.

Upon starting of the vehicle engine, the input shaft 14 will rotate the pump member 29 causing a high velocity fluid stream to be delivered by the pump member to the first turbine 30 resulting in the latter being driven at a relatively high speed which, acting through the gearing 13, will be converted into a low-speed high-torque actuation of the output shaft 15. This same velocity stream in passing through the second or intermediate-speed turbine 31 is effective thereon to drive the same at a lower rate of speed than the first turbine and which, acting through the gearing 13, will deliver additional low-speed high-torque rotary movement to the output shaft. The same fluid stream traversing the low speed turbine 32 is effective thereon to drive the same at a relatively low speed which, by reason of the 1 to 1 ratio of the direct-drive connection, will be the same speed as that of the output shaft 15 but notwithstanding this relavely low speed of the turbine 32, this turbine will still deliver some torque to the output shaft during the stall or starting condition. The aggregate of the torque components delivered to the output shaft 15 by the turbines 30, 31 and 32 during the stall condition will therefore be a desired high value of starting torque.

Figure 2:
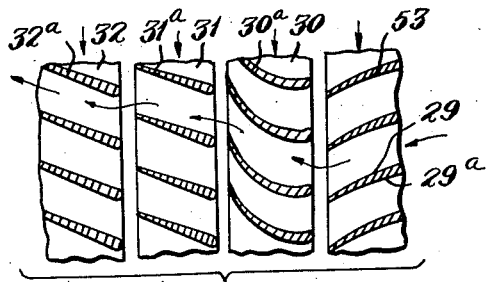
Fig. 2 is a fragmentary view of a diagrammatic nature illustrating the cooperating relation of the multiple turbines with the pump member.

Fig. 2 of the drawings shows the cooperating relation between the pump member 29 and the first, second and third turbines 30, 31 and 32, by diagrammatically representing the blade contour and relative inclination of the vanes of these members. This view shows the blade contour and relative inclination of the vanes 29a of the pump member 29 in the delivery portion 53 of this member. This view also shows the blade contour and relative inclination for the vanes 30a, 31a and 32a of the first, second and third turbine members 30, 31 and 32.

In view of the torque amplification ratios provided for the first and second turbines 30 and 31 by the gearing 13, as explained above, these turbines will be very effective in applying a high value of torque to the output shaft 15 at the stall or starting condition of operation of the transmission 10, such that this transmission will be well suited for use in automobiles and for heavy duty service, such as for tractors, delivery trucks and various other vehicles carrying heavy loads.

During the condition of operation of the transmission 10 immediately following the stall condition, the turbines 30 and 31 will continue to deliver torque to the output shaft 15, but in gradually decreasing amounts as the speed of the output shaft increases. For some given speed and load condition, the turbines 30, 31 and 32 will be delivering substantially equal amounts of torque. As the speed of rotation of the output shaft 15 increases, there is a further gradual decrease in the over-all torque amplification ratio until the speed of the output shaft is substantially equal to the speed of the input shaft 14. At this time, the turbines 30, 31 and 32 will be rotating at substantially the same speed as the pump member 29 and the torque converter 12 will then be operating as a fluid coupling with the turbines 30 and 31 running idle. When this condition is reached, the reaction member 33 rotates freely in a forward direction at substantially the same speed as the pump and turbine members and, at this time, the planetary gearing 13 is substantially ineffective as a reduction gearing.

Figure 3:
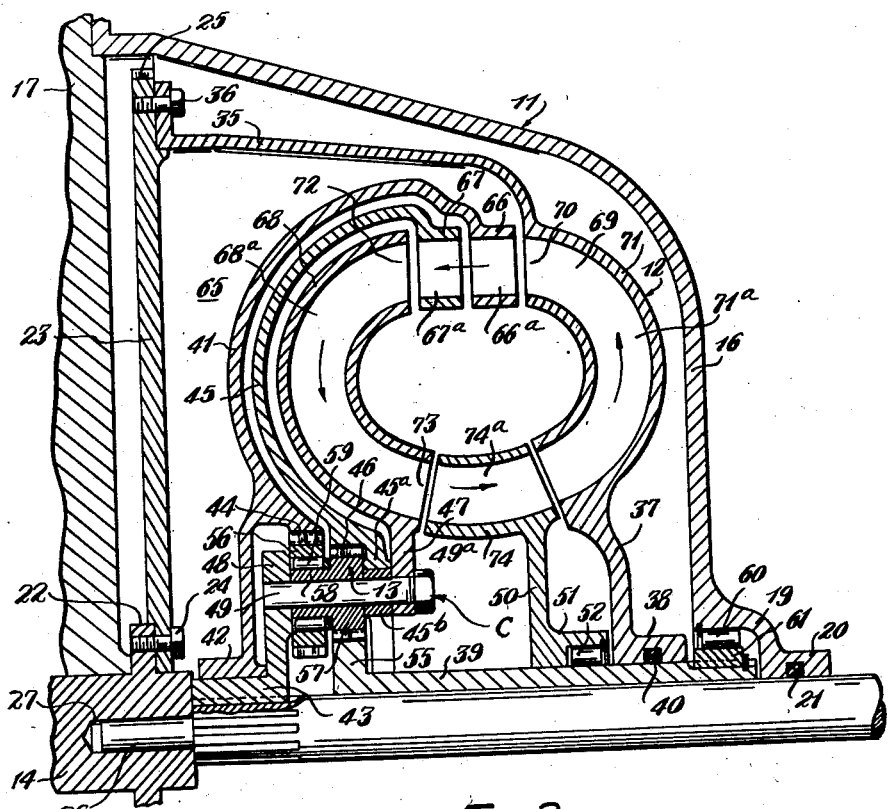
Fig. 3 is mainly a vertical axial section similar to Fig. 1, but showing a modified and preferred form of the transmission.

Fig. 3 of the drawings shows another and preferred form of transmission 65 which is generally similar to the transmisison 10 of Fig. 1, but in which the first and second turbines, that is the high-speed and intermediate-speed turbines 66 and 67, are of a relatively narrow transverse width axially of the transmission. In this modified transmission 65, the third of low-speed turbine 68 is of such size and shape that it constitutes a substantially greater angular extent of the transverse annular fluid passage 69 than the aggregate angular extent of the high-speed and intermediate-speed turbines 66 and 67. Thus, as shown in Fig. 3, the angular extent of the low-speed turbine 68 may be substantially greater than 90°. In the modified transmission 65, the annular fluid circuit 69 is also of such shape or contour that the narrow high-speed and intermediate-speed turbines 66 and 67 define passage portions of the fluid circuit which extend in parallel relation to the axis of the output shaft 15.

In all other respects, the transmission 65 is substantially the same as the above-described transmission 10 and the same reference characters have been applied to the same corresponding parts. The transmission 65 functions in the same general way as has been explained above in detail for the transmission 10 with the turbines 66 and 67 delivering a high value of torque to the output shaft 15 during the stall or starting condition and the turbine 68 delivering substantially all of the torque to the output shaft during the subsequent running condition.

Figure 4:
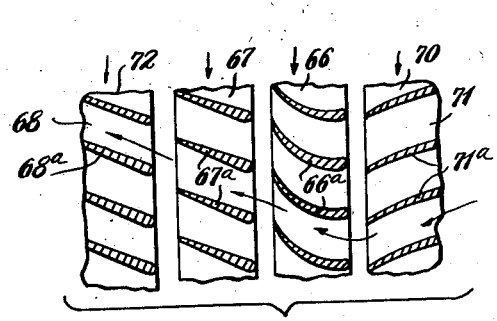
Fig. 4 is a fragmentary view of a diagrammatic nature similar to Fig. 2, but showing the cooperating relation for the multiple turbines and the pump member of the modified torque converter of Fig. 3.

Fig. 4 is a diagrammatic view illustrating the cooperating relation of the high-speed and intermediate-speed turbines 66 and 67 with the delivery portion 70 of the pump member 71 and the inlet portion 72 of the low-speed turbine 68. Fig. 4 also shows the blade contour and relative inclination for the vanes 71a of the pump member 71 in the discharge portion 70 thereof. Likewise, Fig. 4 shows the blade contour and angular inclination of the vanes 66a and 67a of the high-speed and intermediate-speed turbines 66 and 67 and for the inlet portion 72 of the low-sped turbine 68.

Figure 5:
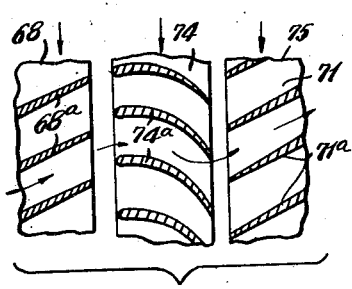
Fig. 5 is a fragmentary view of a diagrammatic form showing the cooperating relation between the low-speed turbine, the reaction member and the pump member.

Fig. 5 of the drawings is a diagrammatic view illustrating the cooperation of the delivery end 73 of the low-speed turbine 68 and the reaction member 74 with the inlet portion 75 of the pump member 71. This view also shows the blade contour and relative inclination of the vanes 74a of the reaction member 74 and of the vanes 71a in the inlet portion 75 of the pump member 71, as well as the blade contour and relative inclination of the vanes 68a of the low-speed turbine 68 in the delivery portion 73 of the latter.

From the foregoing detailed description and the accompanying drawings it will now be readily understood that the improved multiple-turbine transmission of this invention provides for a desired high value of torque in the output shaft during the stall or starting condition, such that the improved transmission is well suited for use in automobiles and in trucks and other heavy-load vehicles. Likewise it will be seen that the torque amplification gearing, comprising a double or dual planetary gear means and herein disclosed in the form of compound planetary gearing associated with the high and intermediate speed turbines, affords a simple and compact construction by which the achievement of the high starting torque is made practical and feasible.

Although the improved transmission has been illustrated and described herein to a somewhat detailed extent, it will be understood of course, that the invention is not to be regarded as being limited correspondingly in scope, but includes all changes and modifications coming within the terms of the claims hereof.

Having thus described my invention, I claim:

1. In a power transmission mechanism; a group of cooperating rotatable annular members defining a toroidal fluid circuit including pump means, first, second and third turbines and reaction means in series relation in said fluid circuit; means inhibiting reverse rotation of said reaction means; rotatable power input means connected with said pump means; rotatable output shaft means; and a compound planetary gear system operably connecting said first, second and third turbines with said output shaft means.

2. A power transmission mechanism as defined in claim 1 in which the first and second turbines are of relatively narrow transverse width axially of the mechanism and in which velocity fluid discharged by the pump means flows through said first and second turbines in a direction parallel to the axis of said output shaft means.

3. In a power transmission mechanism; a group of cooperating rotatable annular members defining a toroidal fluid circuit including pump means, first, second and third turbines and reaction means in series relation in said fluid circuit; said first and third turbines being relatively high-speed and relatively low-speed turbines respectively and said second turbine being an intermediate-speed turbine; rotatable power input means connected with said pump means; rotatable output shaft means; means establishing a direct-drive connection between said low-speed turbine and said output shaft means; and compound planetary gearing forming a torque amplifying connection between said first and second turbines and said output shaft means.

4. In a power transmission mechanism; a group of cooperating rotatable annular members including pump means, first, second and third turbines and a reaction means inhibited against reverse rotation; said members defining a toroidal fluid circuit in which said first, second and third turbines are traversed in series relation and rotated by velocity fluid delivered by said pump means; rotatable power input means connected with said pump means; rotatable output shaft means; means establishing a direct-drive connection between said third turbine and said output shaft means; and a compound planetary gear system operably connecting said first and second turbines with said output shaft means.

5. In a power transmission mechanism; a group of cooperating rotatable annular members including pump means, first, second and third turbines and a reaction means inhibited against reverse rotation; said members defining a toroidal fluid circuit in which said first, second and third turbines are traversed in series relation and rotated by velocity fluid delivered by said pump means; rotatable power input means connected with said pump means; rotatable output shaft means; means establishing a direct-drive connection between said third turbine and said output shaft means and including pivot shaft means; ring gears connected with said first and second turbines; sun gear means inhibited against reverse rotation; and planet pinion gear means on said pivot shaft means and having meshed engagement with said ring gears and said sun gear means.

6. In a power transmission mechanism; a group of cooperating rotatable annular members including pump means, first, second and third turbines and a reaction means inhibited against reverse rotation; said members defining a toroidal fluid circuit in which said first, second and third turbines are traversed in series relation and rotated by velocity fluid delivered by said pump means; rotatable power input means connected with said pump means; rotatable output shaft means; means establishing a direct-drive connection between said third turbine and said output shaft means and including pivot shaft members spaced apart in an annular group surrounding said output shaft means; ring gears connected with said first and second turbines; a sun gear inhibited against reverse rotation; sets of planet pinions on said pivot shaft members and meshing with the respective ring gears and one of which pinion sets is also in mesh with said sun gear; and one-way clutch means effective to transmit torque between said pinion sets.

7. In a power transmission mechanism; a group of relatively rotatable bladed annular members including pump means, first, second and third turbines and reaction means; said members defining a toroidal fluid circuit in which said first, second and third turbines are traversed in series relation and rotated by velocity fluid delivered by said pump means; rotatable power input means connected with said pump means; rotatable output shaft means; means inhibiting reverse rotation of said reaction means; a sun gear; means inhibiting reverse rotation of said sun gear; ring gears connected with said first and second turbines; carrier means forming a direct-drive connection between said third turbine and said output shaft means and including pivot shaft members spaced apart in an annular group surrounding said output shaft means; sets of planet pinions mounted on said pivot shaft members and meshing with the respective ring gears; one set of said pinions also having meshed engagement with said sun gear; and one-way clutch means effective to transmit torque between said pinion sets.

8. A power transmission mechanism as defined in claim 7 in which the first, second and third turbines are high, intermediate and low speed turbines respectively; and in which the sets of planet pinions comprise a first set meshed with the ring gear of said first turbine and a second set in meshed engagement with the ring gear of said second turbine and said sun gear; said one-way clutch means being effective to transmit torque from the first pinion set to the second pinion set.

9. A power transmission as defined in claim 7 in which the first and second turbines are of relatively narrow transverse width axially of the mechanism and are disposed such that velocity fluid discharged by the pump means flows through said first and second turbines in a direction parallel to the axis of said output shaft means; and in which the third turbine defines a passage portion of at least 90 degrees angular extent of said fluid circuit.

10. In a power transmission mechanism; a group of cooperating rotatable annular members including pump means, high-speed, intermediate-speed and low-speed turbines, and a reaction means inhibited against reverse rotation; said members defining a toroidal fluid circuit in which said high-speed, intermediate-speed and low-speed turbines are traversed in series relation and rotated by velocity fluid delivered by said pump means; rotatable power input means connected with said pump means; rotatable output shaft means; connecting means establishing a direct-drive connection between said low-speed turbine and said output shaft means; and planetary torque amplification gearing common to said high-speed and intermediate-speed turbines and effective through said connecting means for operably connecting said high-speed and intermediate-speed turbines with said output shaft means such that said high-speed and intermediate-speed turbines deliver a high value of starting torque to said output shaft means.

11. A power transmission mechanism as defined in claim 10 in which said torque amplification gearing is a compound planetary gear system including sun gear means inhibited against reverse rotation and planet pinion means carried by said connecting means.

12. In a power transmission mechanism; a group of cooperating rotatable bladed annular members including pump means, first and second turbines, and a reaction means inhibited against reverse rotation; said members defining a toroidal fluid circuit in which said first and second turbines are traversed in series relation and rotated by velocity fluid delivered by said pump means; rotatable power input means connected with said pump means; rotatable output shaft means; ring gears connected with said first and second turbines respectively for rotation therewith; sun gear means inhibited against reverse rotation; planet pinion gear means meshed with and disposed between said sun gear means and said ring gears; and rotatable carrier means supporting said planet pinion gear means and secured in driving connection with said output shaft means, the meshed engagement of said planet pinion gear means with said sun gear means and with the ring gear of one of said turbines providing a torque transmission means of a given gear ratio and the meshed engagement of said planet pinion gear means with the ring gear of the other of said turbines providing a torque transmission means of a different gear ratio.

13. In a power transmission mechanism; a group of cooperating rotatable bladed annular members including pump means, first and second turbines, and a reaction means inhibited against reverse rotation; said members defining a toroidal fluid circuit in which said first and second turbines are traversed in series relation and rotated by velocity fluid delivered by said pump means; rotatable power input means connected with said pump means; rotatable output shaft means; ring gears of different pitch diameters connected for rotation with said first and second turbines respectively; coaxially connected planet pinion gears of different pitch diameters meshed with the respective ring gears; a sun gear inhibited against reverse rotation and meshed with one of said planet pinion gears; and rotatable carrier means supporting said planet pinion gears and secured in driving connection with said output shaft means, the meshed engagement of one of said planet pinion gears with its associated ring gear and with said sun gear providing a torque transmission means of a given gear ratio and the meshed engagement of the other planet pinion gear with its associated ring gear providing a torque transmission means of a different gear ratio.

14. In a power transmission mechanism; a group of cooperating rotatable bladed annular members including pump means, first and second turbines, and a reaction means inhibited against reverse rotation; said members defining a toroidal fluid circuit in which said first and second turbines are traversed in series relation and rotated by velocity fluid delivered by said pump means; rotatable power input means connected with said pump means; rotatable output shaft means; ring gears connected with said first and second turbines respectively for rotation therewith; a rotatable carrier drivingly secured on said output shaft means and including a pinion shaft; a sun gear inhibited against reverse rotation; a first planet pinion gear disposed between and having meshed engagement with said sun gear and the ring gear of one of said turbines; said first planet pinion gear being rotatable on said pinion shaft; a second planet pinion gear rotatable about said pinion shaft and having meshed engagement with the ring gear of the other of said turbines; and one-way clutch means effective to transmit torque between said planet pinion gears; the meshed engagement of said first planet pinion gear with its associated ring gear and with said sun gear providing a torque transmission means of a given gear ratio and the meshed engagement of said second planet pinion gear with its associated ring gear providing a torque transmission means of a different gear ratio.

15. In a power transmission mechanism; a group of cooperating rotatable bladed annular members defining a toroidal fluid circuit including pump means, first, second and third turbines and reaction means in series relation in said fluid circuit; rotatable power input means connected with said pump means; rotatable output shaft means; rotatable connecting means establishing a substantially direct-drive connection between said third turbine and said output shaft means; and dual planetary gear means operably connecting said first and second turbines with said output shaft means through said rotatable connecting means.

16. In a power transmission mechanism; a group of cooperating rotatable bladed annular members defining a toroidal fluid circuit including pump means, first, second and third turbines and reaction means in series relation in said fluid circuit; rotatable power input means connected with said pump means; rotatable output shaft means; rotatable carrier means establishing a substantially direct-drive connection between said third turbine and said output shaft means; and dual planetary gear trains operably connecting said first and second turbines with said output shaft means through said carrier means and comprising ring gears connected with said first and second turbines and sets of planet pinions on said carrier means and meshing with said ring gears.

17. In a power transmission mechanism; a group of cooperating rotatable annular members including pump means, first, second and third turbines and a reaction means inhibited against reverse rotation; said members defining a toroidal fluid circuit in which said first, second and third turbines are traversed in series relation and rotated by velocity fluid delivered by said pump means; rotatable power input means connected with said pump means; rotatable output shaft means; means establishing a direct-drive connection between said third turbine and said output shaft means comprising a planet pinion carrier means common to a first planetary gear train and to a second planetary gear train; a rotatable gear element of said first planetary train being connected to said first turbine; a rotatable gear element of said second planetary train being connected to said second turbine; first and second sets of planet pinions on said carrier means; and planetary train reaction means operative to selectively constrain movement of said carrier means to operate at a planetary train reduced speed ratio; said rotatable element of said first planetary train having meshed engagement with the planet pinions of said first set and said rotatable element of said second planetary train having meshed engagement with the planet pinions of said second set.

18. In a power transmission mechanism; a group of cooperating rotatable annular members including pump means, first, second and third turbines and a reaction means inhibited against reverse rotation; said members defining a toroidal fluid circuit in which said first, second and third turbines are traversed in series relation and rotated by velocity fluid delivered by said pump means; rotatable power input means connected with said pump means; rotatable output shaft means; means establishing a direct-drive connection between said third turbine and said output shaft means and including pivot shaft members; two planetary gear trains including planetary train gear means connected with said first and second turbines; planet pinion means on said pivot shaft members and meshing with the first mentioned planetary train gear means; and a further planetary train gear means inhibited against reverse rotation and meshing with said planet pinion means.

19. In a power transmission mechanism; a group of relatively rotatable annular members including pump means, first, second and third turbines and reaction means; said members defining a toroidal fluid circuit in which said first, second and third turbines are traversed in series relation and rotated by velocity fluid delivered by said pump means; rotatable power input means connected with said pump means; rotatable output shaft means; means inhibiting reverse rotation of said reaction means; dual carrier means forming a direct-drive connection between said third turbine and said output shaft means; a first set of planet pinions rotatably mounted on said dual carrier means and meshing with a planetary gear train rotatable element; a second set of planet pinions also rotatably mounted on said dual carrier means and meshing with a planetary gear train rotatable element; and planetary gear unit reaction means meshing with at least one set of said planet pinions; said first turbine being connected with one of said planetary gear train rotatable elements and said second turbine being connected with the other of said planetary gear train rotatable elements.

20. In a power transmission mechanism; a group of cooperating rotatable annular members defining a toroidal fluid circuit including pump means, first, second and third turbines and reaction means in series relation in said fluid circuit; means inhibiting reverse rotation of said reaction means; rotatable power input means connected with said pump means; rotatable output shaft means; gear means operably connecting said first, second and third turbines with said output shaft means and comprising plural planetary gear trains having input gear elements and planet pinion carrier means common to all of said gear trains; said first turbine being connected to an input gear element of one of said trains and said second turbine being connected to an input gear element of another of said trains; said trains also comprising sets of planet pinions on said carrier means and meshing with the respective input gear elements of said trains; and reaction gear means meshing with at least one set of said planet pinions.

21. In a power transmission mechanism; a group of cooperating rotatable annular members defining a toroidal fluid circuit including pump means, first, second and third turbines and reaction means in series relation in said fluid circuit; means inhibiting reverse rotation of said reaction means; rotatable power input means conected with said pump means; rotatable output shaft means; a double planetary gear means operably connecting said first, second and third turbines with said output shaft means and comprising a pair of planetary gear trains having input gear elements and planet pinion carrier means common to said pair of trains; said pair of trains also comprising first and second sets of plant pinions on said carrier means and meshing with the respective input gear elements of said pair of trains; and reaction gear means meshing with at least one set of said planet pinions; said first turbine being connected to the input gear element of one of said trains, said second turbine being connected to the input gear element of the other of said trains, and said third turbine being connected to said output shaft means through said carrier means.

22. A power transmission comprising a hydrokinetic torque converter having a toroidal flow circuit in which are positioned a pump, three independently rotatable turbines and a reaction member arranged to receive the circulating fluid successively, a power input member connected to the pump, a power output member, a planetary gear set comprising a planet carrier means fixed to said output member, a pair of axially spaced planet gears mounted on said carrier means, means including a gear connected to said first turbine and meshing with one of said planet gears for driving the carrier means through such one planet gear, means including a gear connected to said second turbine and meshing with the other planet gear for driving said carrier means through such other planet gear, means forming a direct drive connection between said third turbine and said carrier means, and means for preventing reverse rotation of said reaction member.

23. A power transmission comprising a hydrokinetic torque converter having a toroidal flow circuit in which are positioned a pump, three independently rotatable turbines and a reaction member arranged to receive the circulating fluid successively, a power input member connected to said pump, a power output member, a planetary gear set comprising a planet carrier means fixed to said output member, a pair of axially spaced planet gears mounted on said carrier means, means including a ring gear directly connected to said first turbine and meshing with one of said planet gears for driving said carrier means through such one planet gear, means including another ring gear directly connected to said second turbine and meshing with the other planet gear for driving said planet carrier means through such planet gear, means establishing a driving connection between said third turbine and said carrier means, and means to prevent reverse rotation of said reaction member.

24. A power transmission comprising a hydrokinetic torque converter having a toroidal flow circuit in which are positioned a pump, three independently rotatable turbines and a reaction member arranged to receive the circulating fluid successively, a power input member connected to said pump, a power output member, a planetary gear set comprising a planet carrier means fixed to said output member, a pair of axially spaced planet gears mounted on said carrier means, a gear connected to said first turbine and meshing with one of said planet gears, reaction means for said one of said planet gears, a gear connected to said second turbine and meshing with the other planet gear, reaction means for said other planet gear, means forming a direct drive connection between said third turbine and said carrier means, and means for preventing reverse rotation of said reaction member.

25. A power transmission comprising a hydrokinetic torque converter having a toroidal flow circuit in which are positioned a pump, three independently rotatable turbines and a reaction member arranged to receive the circulating fluid successively, a power input member connected to said pump, a power output member, a planetary gear set comprising a planet carrier means fixed to said output member, a pair of axially spaced planet gears mounted on said carrier means, a ring gear connected to said first turbine and meshing with one of said planet gears, reaction means for said one of said planet gears, another ring gear connected to said second turbine and meshing with the other planet gear, reaction means for said other planet gear, means establishing a driving connection between said third turbine and said carrier means, and means to prevent reverse rotation of said reaction member.

No references cited.